H. H. PIERCE.
FILM HOLDER.
APPLICATION FILED JULY 14, 1919.
1,336,377.
Patented Apr. 6, 1920.
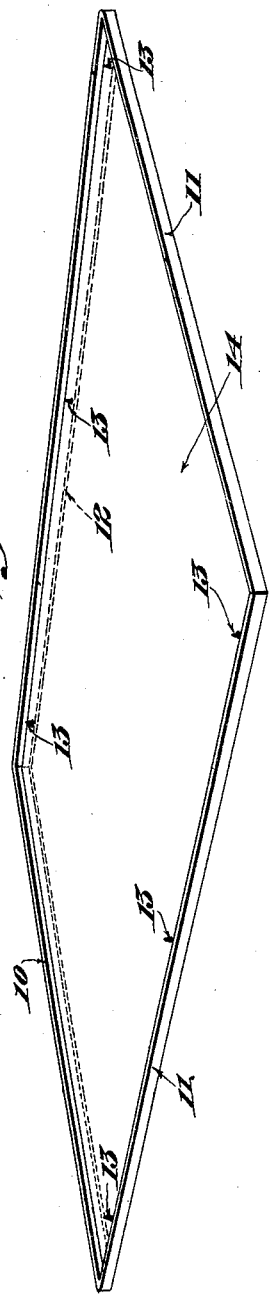
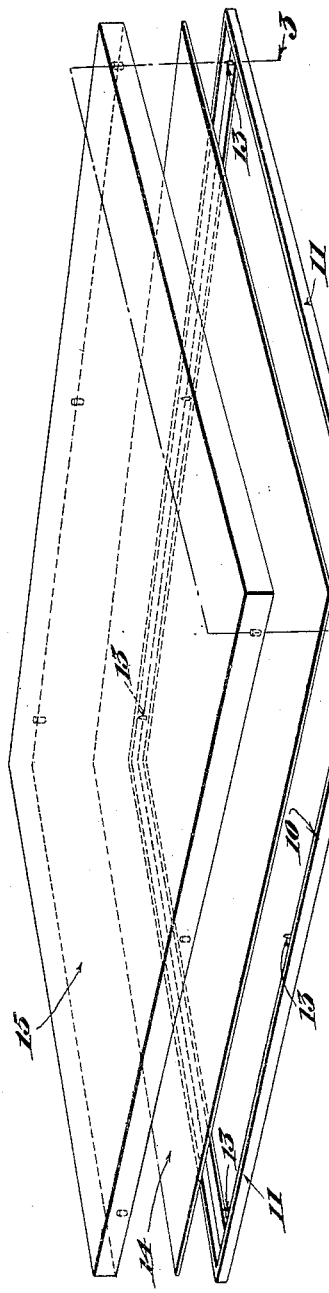
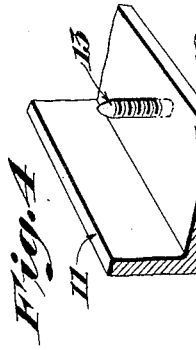
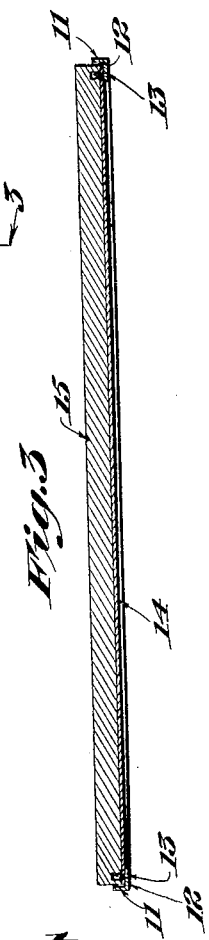
Witness
Inventor
Henry Havelock Pierce
by his attorneys

UNITED STATES PATENT OFFICE.

HENRY H. PIERCE, OF CAMBRIDGE, MASSACHUSETTS.

FILM-HOLDER.

1,336,377. Specification of Letters Patent. Patented Apr. 6, 1920.

Application filed July 14, 1919. Serial No. 310,724.

*To all whom it may concern:*

Be it known that I, HENRY HAVELOCK PIERCE, a citizen of the United States, residing at Cambridge, in the county of Middlesex and State of Massachusetts, have invented certain new and useful Improvements in Film-Holders; and I do hereby declare the following to be a full, clear, and exact description of the invention, such as will enable others skilled in the art to which it appertains to make and use the same.

The present invention relates to an improvement in film holders.

The object of the invention is to produce an improved construction of film holder adapted for use in a camera and in developing, fixing, washing and drying in the same manner as a plate. To this end the invention consists of the film holder hereinafter described and particularly defined in the claims.

In the accompanying drawings illustrating the preferred form of the invention Figure 1 is a perspective view of the film holder with a film in place in it; Fig. 2 is a separated view of the film holder, the film and the loading board; Fig. 3 is a cross-section of the parts illustrated in Fig. 2 assembled, and Fig. 4 is an enlarged detail showing a portion of the film holder and a barb.

The illustrated embodiment of the invention is described as follows:—

The film holder consists of a rectangular metal frame 10 having a vertical wall 11 and a horizontal flange 12 at the bottom at right angles thereto. The height of the vertical wall 11 is the same as the thickness of a photographic plate and the horizontal flange 12 is somewhat wider than the vertical flange and is provided with six barbs 13, arranged in pairs opposite each other as shown, one pair being at one end, one pair being in the middle, and one pair being at the other end of the longer sides of the frame. The film 14 is of a size such as to fit within the side walls 10 of the frame. The film 14 is placed within the frame and the loading board 15 having holes corresponding in positions with the barbs 13 is pressed down upon the film, thereby impaling the film upon the barbs. The barbs 13 are screw-threaded or corrugated or otherwise roughened so that when the film has been pressed down upon them they hold the film securely in position in the frame. The coated side of the film is laid next to the frame.

This film holder provided with the film may be inserted in an ordinary plate holder in exactly the same manner as a glass plate with the inturned flange of the holder up so as to bring the coated surface of the film to the plane occupied by the coating when a glass plate is used, the difference of the position of the coated side of the film from the position of the coated side of a plate being only that due to the thickness of the inturned flange of the film holder, say 15 or 20 thousandths of an inch, which is a difference that is negligible in securing precision of focus. After the exposure the film holder may be taken out of the plate holder and developed, fixed, washed and dried in exactly the same manner as a plate.

It is to be observed that the film holder has no projections from it and requires absolutely no change to be made in the plate holder. It is to be noted further that the barbs are inside of the frame and between the top and bottom surfaces thereof, so that they are entirely protected from contact with anything, no matter which side the film holder may be laid down, and, moreover, that the film is protected by the frame and that accidental disengagement of the film from the frame is rendered unlikely.

Having thus described the invention, what is claimed is:

1. A film holder comprising an open frame for use in the ordinary plate holder, said frame having walls corresponding in height to the thickness of an ordinary photographically sensitive plate, and means supported from the walls inside of the frame and between the top and bottom surfaces thereof for engaging and holding a film therein.

2. A film holder comprising an open frame provided with an inwardly extended flange having barbs on the flange for holding the film.

3. A film holder comprising an open frame for use in the ordinary plate holder, said frame having walls corresponding in height to the thickness of an ordinary photographically sensitive plate, provided with an inwardly extended flange and means supported by the flange between the top and bottom surfaces of the frame for engaging and holding a film therein.

4. A film holder comprising an open frame having an outer wall and a narrow flange extended inwardly from the lower portion of the inside thereof, said flange being provided with barbs projecting therefrom inside of the outer wall adapted to pierce and hold the film thereon.

5. A film holder comprising a frame for holding the film, said frame having walls corresponding in height to the thickness of an ordinary photographically sensitive plate, adapted to be engaged by the plate holder to hold the frame in position therein, and provided with barbs supported inside the frame between the top and bottom surfaces thereof.

HENRY H. PIERCE.